United States Patent Office 3,580,710
Patented May 25, 1971

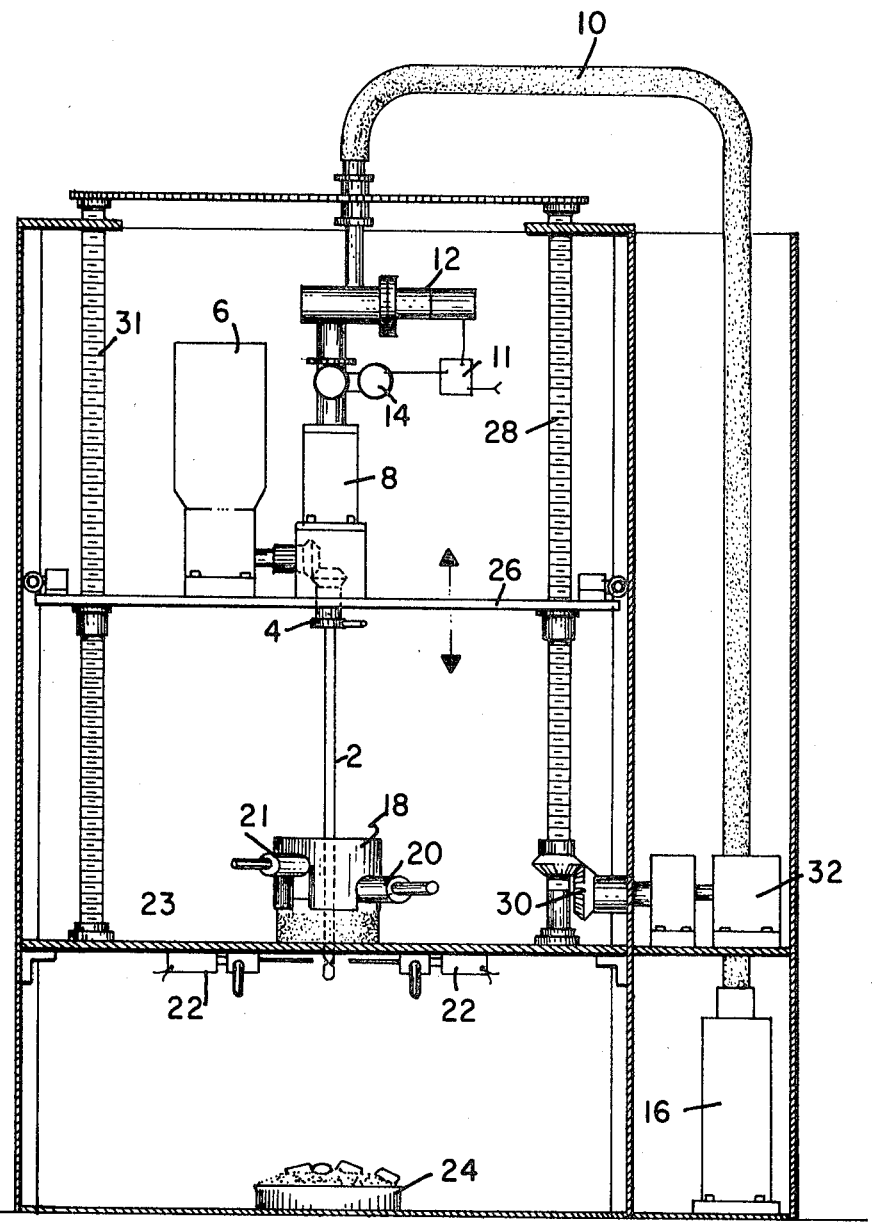

---

3,580,710
PARTICLE TUBE FUSION FURNACE
Richard G. Britt, Burlington, and Frederick A. Loughridge, Manchester, Mass., assignors to Sylvania Electric Products Inc.
Filed Nov. 15, 1968, Ser. No. 776,208
Int. Cl. C03b 3/00, 19/06
U.S. Cl. 65—144                                      5 Claims

ABSTRACT OF THE DISCLOSURE

Equipment for the manufacture of quartz bodies which are free of air pockets including a vacuum system associated with a holder for quartz tubing. The end of quartz tubing is disposed within a furnace for softening. When soft, the quartz is cut off and a body of air-free quartz is formed.

BACKGROUND OF THE INVENTION

Field of the invention

The manufacture of quartz bodies and subsequent fabrication of tubing from such bodies has been disclosed in the application of Loughridge et al, Ser. No. 749,554, filed June 26, 1968, and assigned to the same assignee as the present invention. According to the present invention, we have devised equipment which will readily manufacture the quartz bodies in a uniform shape and composition.

Summary of the invention

According to the present invention, the equipment includes a vertically movable rotary seal attached to a vacuum line. Disposed beneath the seal is a furnace, generally in the shape of a cylinder, which includes one or more heating units or burners. A cutter is disposed beneath the furnace and arranged to sever bodies of molten quartz when they are formed.

A quartz tube having one open and one closed end, filled with particulate silica, is mounted in the rotatable seal The closed end is disposed within the furnace and heated until all of the particulate silica is converted into the vitreous state. At the same time, the vacuum line withdraws air, water and other gaseous or vaporous substances from the tube. When soft and cutable, the tubing is lowered through the furnace and between the cutters which are then actuated to cut a segment of quartz. The molten mass then drops into a receptacle and the end of the tubing is elevated back into the furnace for further heating. During the heating, the tubing is continuously rotated and the vacuum is maintained. Such rotation provides fairly uniform softening of the tube and insures that all of the particulate silica will be converted into the vitreous state.

BRIEF DESCRIPTION OF THE DRAWING

The figure is an elevational view, partly in cross-section, of the equipment which can be used to form the quartz bodies.

DESCRIPTION OF THE PREFERRED EMBODIMENT

A tube 2 of quartz is suspended from a conventional compression fitting 4 which can be loosened or tightened to provide for insertion and removal of the tube 2. The fitting provides a vacuum tight seal and allows gaseous and vaporous substances to be withdrawn from the tube 2. A rotary motor 6 drives the compression fitting 4 through a conventional gear train (shown in phantom lines). Preferably, a rotary seal 8 is housed within a gear train and is connected to a flexible vacuum line 10. Disposed between the rotary seal 8 and the vacuum line 10 is a system including a valve 12 and a conventional trap 14. The latter prevents particulate material from entering the vacuum pump 16 and the former provides for maintaining the vacuum in the system when it is necessary to disconnect the tube 2 from the compression fitting 4.

The lower end of the quartz tube 2 is disposed within a furnace 18 which can be heated by main burners 20 and secondary burner 21 or other suitable heating means preferably mounted on fixed platform 23. The heat from the furnace is directed toward the tube 2.

Disposed beneath the furnace 18, preferably mounted on the fixed platform 23 are a pair of water-cooled tungsten or molybdenum cutters 22 which can be actuated to come together and sever a segment of softened quartz from the tube 2. The quartz segments fall into the receiver 24 which can be a pot filled with sand. When using tungsten or molybdenum, the metal does not stick to the glass because of the formation of a volatile oxide. This prevents metal contamination of the quartz.

To move the softened end of the tube 2 from the furnace 18 to between the cutters 22, rotary seal 8 and its appendages are mounted upon a vertically movable platform 26 which moves up and down on drive shaft 28 and idler shaft 31. Drive shaft 28 is activated by bevel gears 30 and platform drive motor 32.

When the platform is moved up and down, flexible vacuum line 10 is free to move with it.

OPERATION

When starting up the equipment, vacuum in the system is shut off by closing valve 12 and opening valve 14. Quartz tube 2, filled with sand, is placed in compression fitting 4 and the latter is tightened. Valve 12 is then opened and valve 14 is partially opened until a constant vacuum in the order of 25 microns is attained. Such constant pressure will indicate that the gases contained within tube 2 are evacuated. Valve 14 is then opened and the line from vacuum pump 16 is clear. Opening and closing the valves can be controlled automatically by control 11. Rotary motor 6 is then turned on and tube 2 is rotated. tube 2 are evacuated. Vale 14 is then opened and the line the tip is preheated and then the tip is disposed before primary burner 20. Raising and lowering the rod 2 is done by actuating motor 32 which, in turn, raises or lowers table 26 through shaft 28. When fully heated, the sand in the tube 2 becomes soft and viscous and the tube 2 and the sand particles merge into one another. To form a bubble free mass, the heated end of tube 2 becomes molten or plastic and is ready for lowering between cutters 22. The motor 6 is shut off and the softened end of tube 2 is snipped by actuating cutters 22. To cut the quartz tubing, a double stroke is used. With the first stroke, a thin section is created in the softened quartz, but the body is not severed from the tubing. The thin section solidifies after the cutters are withdrawn following the first stroke. During the second stroke, the body is broken from the tubing and falls into the receiver 24. During both strokes (and the heating) the vacuum is maintained through line 10. The rotary motor 6 is turned on again and the end of the tube 2 is withdrawn in front of burner 20 for another heating cycle. The table 26 is lowered a distance no more than the length of the quartz tubing which is heated by the furnace and is soft.

The lowering of the heated end of the tube 2, the snipping and withdrawing into the furnace 18 is continued until the supply of tubing in the fitting 4 is depleted. The rotary motor 6 is shut off, valve 12 and then valve 14 are closed and then the residual of tube 2 is removed. A new piece of tubing is placed in the fitting 4 and the operation is started anew.

As our invention, we claim:

1. Equipment for the manufacture of air-free quartz bodies comprising: a vertically movable platform mounted within a housing; means for raising and lowering said platform; a rotatable compression fitting mounted on said platform, the axis of rotation of said fitting being vertical; a vacuum tight rotary seal disposed above said fitting and in operative relationship therewith; means for rotating said fitting and seal; a flexible vacuum line connected between a vacuum pump and said seal; means for operating said vacuum pump; a furnace disposed below said fitting and substantially coaxial therewith; a pair of cutters disposed below said furnace, the cutting action of said cutters being at about the extended axis of said fitting; a receptacle disposed directly below said cutters; and a control prearranged to lower said platform a predetermined distance, actuate said cutters and then raise said platform a lesser predetermined distance.

2. The equipment according to claim 1 wherein said furnace includes a lower main gas burner and an upper secondary gas burner.

3. The equipment according to claim 1 wherein said cutters comprise water-cooled tungsten shears.

4. The equipment according to claim 1 wherein said cutters comprise water-cooled molybdenum shears.

5. The equipment according to claim 1 wherein said receptacle comprises a sand-filled receiver.

References Cited

UNITED STATES PATENTS

| | | | |
|---|---|---|---|
| 1,579,019 | 3/1926 | Miller | 65—Quartz Dig. |
| 2,006,947 | 7/1935 | Ferguson | 65—335X |
| 2,268,546 | 1/1942 | Forter | 65—335X |
| 2,930,098 | 3/1960 | Emeis | 65—18 |
| 3,227,032 | 1/1966 | Vipton | 65 LR Dig. |
| 3,261,676 | 7/1966 | Morelock | 65—18 |

FRANK W. MICA, Primary Examiner

U.S. Cl. X.R.

65—335, 280, 18, 32, 109, 110